(12) United States Patent
Lin et al.

(10) Patent No.: US 7,038,408 B2
(45) Date of Patent: May 2, 2006

(54) FAN MOTOR SPEED CONTROL CIRCUIT

(75) Inventors: Yu-liang Lin, Taoyuan (TW);
Yueh-lung Huang, Taoyuan (TW);
Tsung-yu Lei, Taoyuan (TW); Ju-wen Hsieh, Taoyuan (TW); Wen-shi Huang, Taoyuan (TW)

(73) Assignee: Delta Electronics, Inc., (TW)

( * ) Notice: Subject to any disclaimer, the term of this patent is extended or adjusted under 35 U.S.C. 154(b) by 0 days.

(21) Appl. No.: 10/861,719

(22) Filed: Jun. 4, 2004

(65) Prior Publication Data

US 2005/0040778 A1    Feb. 24, 2005

(30) Foreign Application Priority Data

Aug. 21, 2003    (TW) .............................. 92123062 A (51) Int. Cl.
*H02P 1/00*    (2006.01)
*H02P 1/22*    (2006.01)
*H02P 1/40*    (2006.01)
*H02P 3/00*    (2006.01)
*H02P 3/20*    (2006.01)

(52) U.S. Cl. ...................... 318/268; 318/471; 318/472; 318/473; 318/641; 388/934

(58) Field of Classification Search ................ 318/268, 318/471, 472, 473, 641; 388/934
See application file for complete search history.

(56) References Cited

U.S. PATENT DOCUMENTS

| 5,606,232 | A | * | 2/1997 | Harlan et al. | 318/138 |
|---|---|---|---|---|---|
| 6,135,718 | A | * | 10/2000 | Yang | 417/22 |
| 6,188,187 | B1 | * | 2/2001 | Harlan | 318/254 |
| 6,239,991 | B1 | * | 5/2001 | Ajro et al. | 363/41 |
| 6,650,074 | B1 | * | 11/2003 | Vyssotski et al. | 318/254 |
| 6,779,981 | B1 | * | 8/2004 | Huang et al. | 417/42 |
| 2004/0174131 | A1 | * | 9/2004 | Sivertsen | 318/639 |
| 2004/0247449 | A1 | * | 12/2004 | Ma et al. | 417/42 |

\* cited by examiner

*Primary Examiner*—David Martin
*Assistant Examiner*—Erick Glass
(74) *Attorney, Agent, or Firm*—Martine Penilla & Gencarella, LLP (57) ABSTRACT

A fan motor speed control circuit includes a driving circuit, a voltage division circuit, and a speed modulator. The voltage division circuit has a first transistor and a plurality of resistors and is connected between a voltage source and the driving circuit. The speed modulator has a second transistor and a plurality of parallel resistors and is connected between the voltage division circuit and the driving circuit. The current of the fan motor speed control circuit flows through a first path under a first input voltage generated from the voltage source and through a second path under a second input voltage larger than the first one; the parallel resistors are in the second path such that the current value passing through the driving circuit varies according to the resulting resistance value of the parallel resistors.

20 Claims, 7 Drawing Sheets

FAN MOTOR SPEED CONTROL CIRCUIT

BACKGROUND OF THE INVENTION

1. Field of the Invention

The invention relates to a speed control circuit and, more particularly, to a speed control circuit for enabling a fan motor to have various speeds at any selected voltage.

2. Description of the Related Art

Figure 1A:
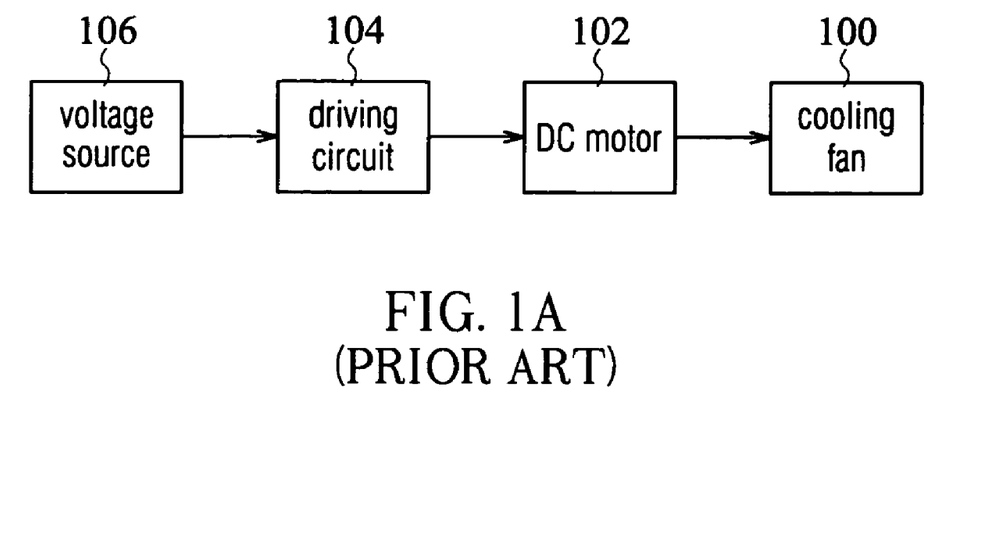
FIG. 1A is a block diagram showing the speed control for a conventional cooling fan.

Referring to FIG. 1A, a conventional cooling fan 100 and a driving circuit 104 is connected to a direct current (DC) motor 102. The voltage of the driving circuit 104 is provided by a voltage source 106, and the driving circuit 104 feeds a signal, often a current signal, to the DC motor 102 to activate it. Typically, the speeds of the cooling fan 100 and the motor 102 are equal because the cooling fan 100 is linked with the motor 102.

In a conventional manner, the fan speed is fixed at any selected voltage, and thus the coil winding of the DC motor 102 must be changed to alter the fan speed at the voltage.

Figure 1B:
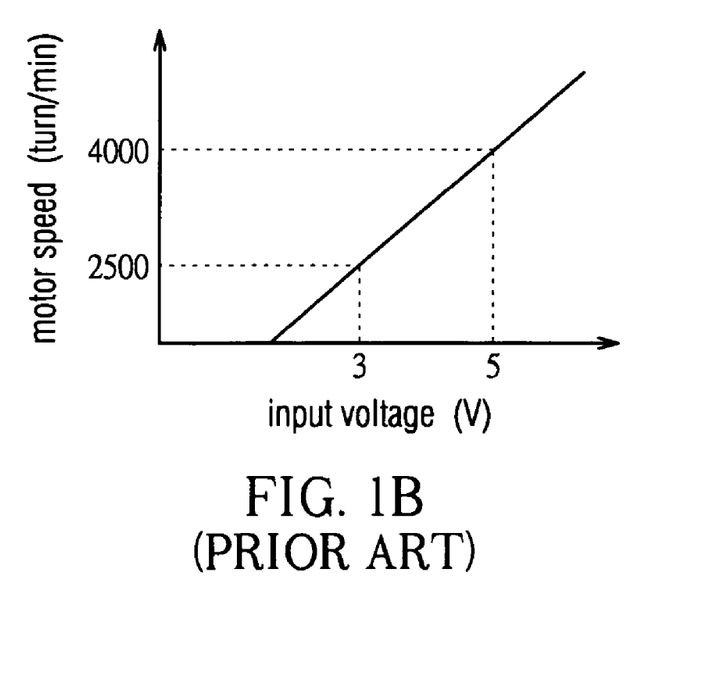
FIG. 1B illustrates the relation between the motor speed and the input voltage in a conventional fan speed control.

For the same coil winding, the relation between the motor speed and input voltage may be represented as a characteristic curve such as a line shown in FIG. 1B. Referring to FIG. 1B, the motor speed is in proportion to the input voltage, and thus when the DC motor 102 receives a input voltage of 3 volts, the speed of the motor 102 is 2500 rpm and 5 volts for 4000 rpm. Hence, for instance, if a motor speed of 3000 rpm is required under an input voltage of 3 volts, it is impossible to achieve through the conventional DC motor 102 without changing the coil winding.

BRIEF SUMMARY OF THE INVENTION

An object of the invention is to provide a speed control circuit to enable a fan motor to have various speeds at any selected voltage.

According to the design of the invention, a fan motor speed control circuit includes a driving circuit, a voltage division circuit, and a speed modulator. The voltage division circuit has a first transistor and a plurality of resistors and is connected between a voltage source and the driving circuit. The speed modulator has a second transistor and a plurality of parallel resistors and is connected between the voltage division circuit and the driving circuit. The current of the fan motor speed control circuit flows through a first path under a first input voltage generated from the voltage source and through a second path under a second input voltage larger than the first one; the parallel resistors are in the second path such that the current value passing through the driving circuit varies according to the resulting resistance value of the parallel resistors.

Through the design of the invention, different current flow paths are created by the alternation of the on and off states for the transistors in the voltage division circuit and the speed modulator. As the current flows through the path in which the parallel resistors are provided, the current value passing through the driving circuit can be easily adjusted at the same voltage only by changing the number or the resistance values of the parallel resistors, and, at the same voltage, the motor speed can be changed to a required value as a result.

DETAILED DESCRIPTION OF THE INVENTION

Figure 2:
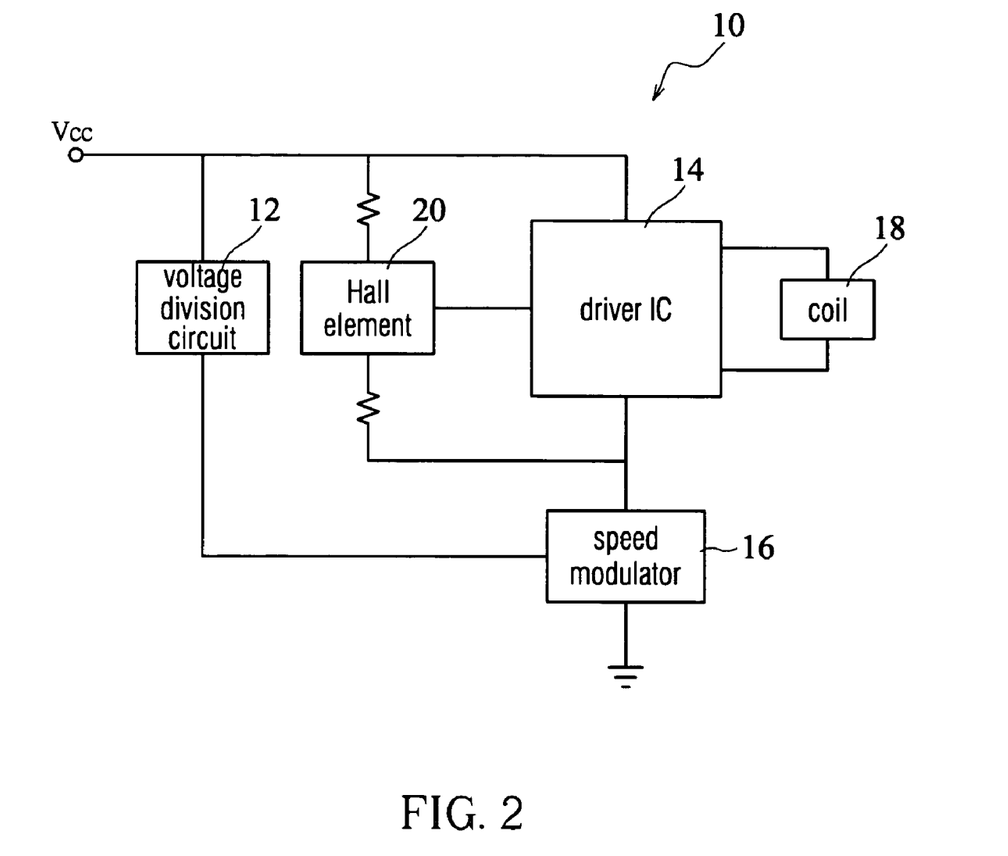
FIG. 2 is a circuit block diagram showing an embodiment of the invention.

Referring to FIG. 2, a fan motor speed control circuit 10 includes a voltage division circuit 12, a driver integrated circuit (driver IC) 14 and a speed modulator 16. One of the input terminals of the driver IC 14 is connected to a hall element 20, which triggers the driver IC 14 to output an alternating pulse to induce the magnetic field in the coil 18.

Figure 3:
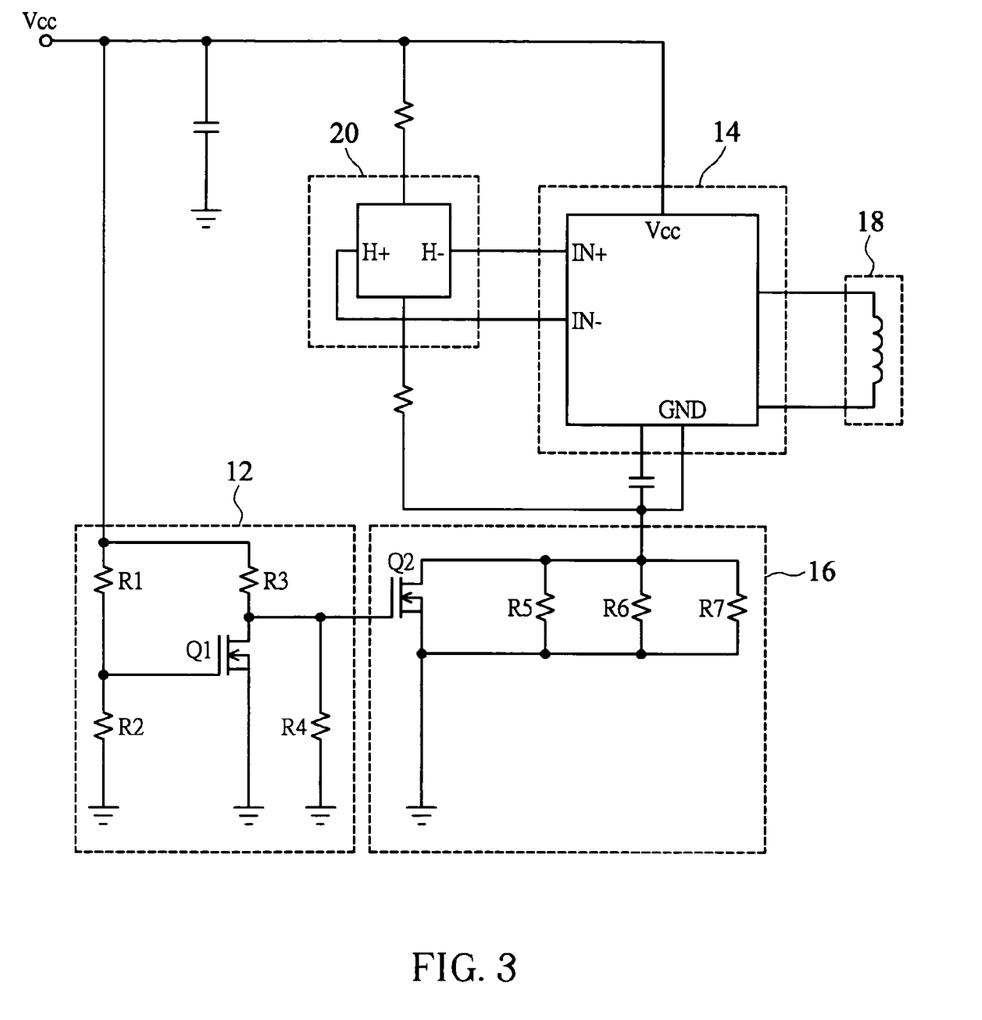
FIG. 3 is a circuit design for the fan motor speed control circuit according to the invention.

As depicted in FIG. 3, the voltage division circuit 12 has a switch, such as a transistor Q1 and a plurality of resistors R1 to R4; the speed modulator 16 has a switch, such as a transistor Q2 and parallel resistors such as R5, R6, and R7. The driver IC 14 incorporates logic circuits consisting of H-bridges and transistors, and the hall element 20 is connected to an input terminal IN of the driver IC 14. The driver IC 14 outputs a drive signal to the coil 18 after the hall element 20 senses the magnetic polarity of the fan motor.

Furthermore, the resistor R1 is connected between a voltage source Vcc and the gate of the transistor Q1. The resistor R2 is connected between the gate of the transistor Q1 and ground. The resistor R3 is connected between the voltage source Vcc and the drain of the transistor Q1. The resistor R4 is connected between the drain of the transistor Q1 and ground. The gate of the transistor Q2 of the speed modulator 16 is connected to both the drain of the transistor Q1 and ground. The source of the transistor Q2 is grounded, and the resistor R4 is connected between the gate of the transistor Q2 and ground. The resistors R1 and R2 form a divider circuit for the transistor Q1 of the voltage division circuit 12, and the resistors R3 and R4 form a divider circuit for the transistor Q2 of the speed modulator 16. The resistance values of these resistors determine the on or off state of the two transistors Q1 and Q2. The speed modulator 16 is also connected to the ground terminal GND of the driver IC 14.

Through such circuit design, for instance, when the voltage source Vcc inputs a voltage such as 3 volts, because the resistance values of the resistors R1 to R4 are selected to have the transistor Q1 off and the transistor Q2 on, the current flows through the voltage source Vcc, the driver IC 14, the transistor Q2, and ground sequentially, without through the parallel resistors R5, R6, and R7. Then, when the voltage source Vcc is changed to input a higher voltage such as 5 volts, the same resistance values of the resistors R1 to R4 enable the transistor Q1 to be on and the transistor Q2 off. Hence, the current flow path is changed to a new one where the current sequentially flows through the voltage source Vcc, the driver IC 14, the plurality of resistors R5, R6, and R7 and ground. Therefore, through the design of the invention, different flow paths created by the alternation of the on and off states for the transistors Q1 and Q2 cause different characteristic curves T1 and T2 shown in FIG. 4.

Figure 4:
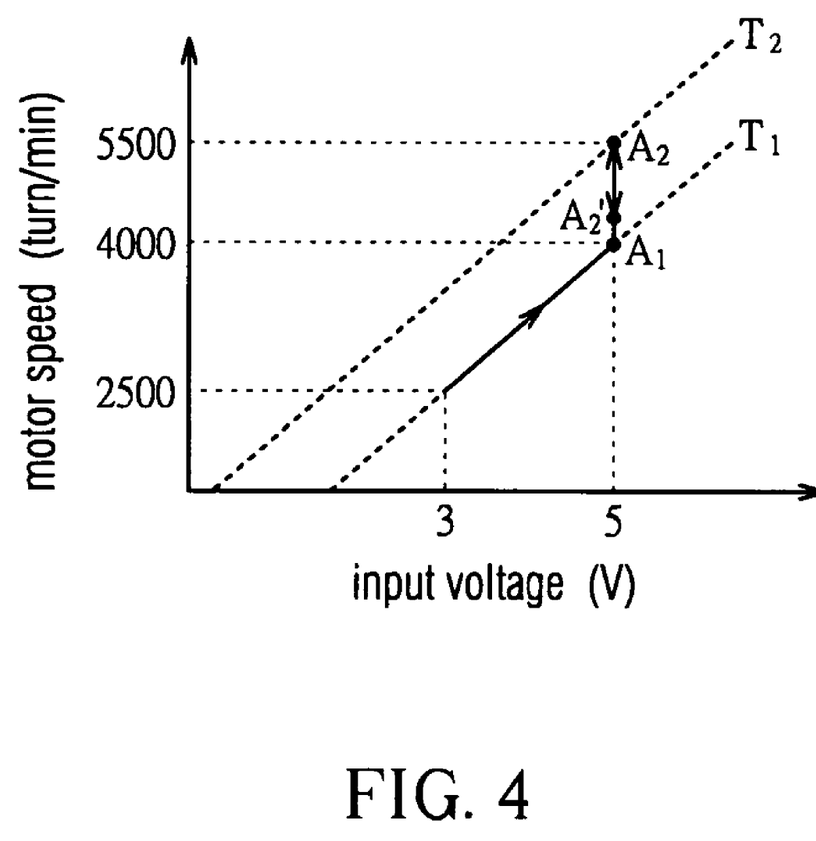
FIG. 4 illustrates the relation between the motor speed and the input voltage according to the invention.

Referring to FIG. 4, for instance, when the input voltage is 3 volts, the current flows through a first path where the relation between the motor speed and the input voltage conforms to the curve T1, so that the motor speed is 2500 rpm. Whereas, when the input voltage is increased to 5 volts, the alternation of the on and off states for the transistors Q1 and Q2 causes the current to flow through a second path corresponding to the curve T2, so that the motor speed is 5500 rpm (point A2) rather than 4000 rpm (point A1).

Since the current flows through the parallel resistors R5, R6, and R7 under the second path, the current value passing through the driving circuit 14 can be easily adjusted at the same voltage only by changing the number or the resistance values of the parallel resistors, and, at the same voltage, the motor speed can be changed to a required value as a result. For example, when the number of parallel resistors decreases, the resulting resistance value of the speed modulator 16 increases and the current value passing through the driver IC 14 decreases, making the motor speed decrease from point A2 to a required speed A2'.

It should be noted that the parallel resistors R5, R6, and R7 are given for illustrative purpose only. The number or the resistance values of the parallel resistors are not limited, but depend on actual demand.

Figure 7:
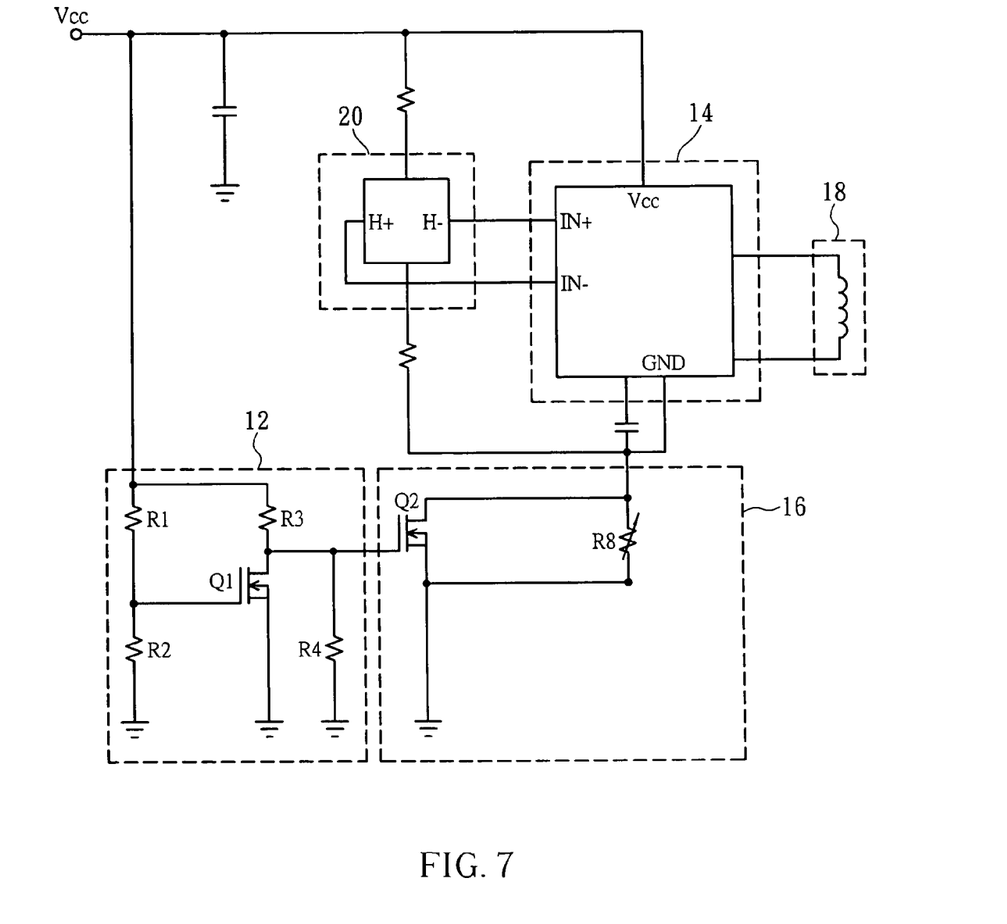
FIG. 7 is another circuit design for the fan motor speed control circuit according to the invention.

Moreover, such as shown in FIG. 7. the resistors of the speed modulator 16 are not limited in the form of parallel resistors and may be replaced by a variable resistor R8, which is also effective in adjusting the motor speed.

Figure 5:
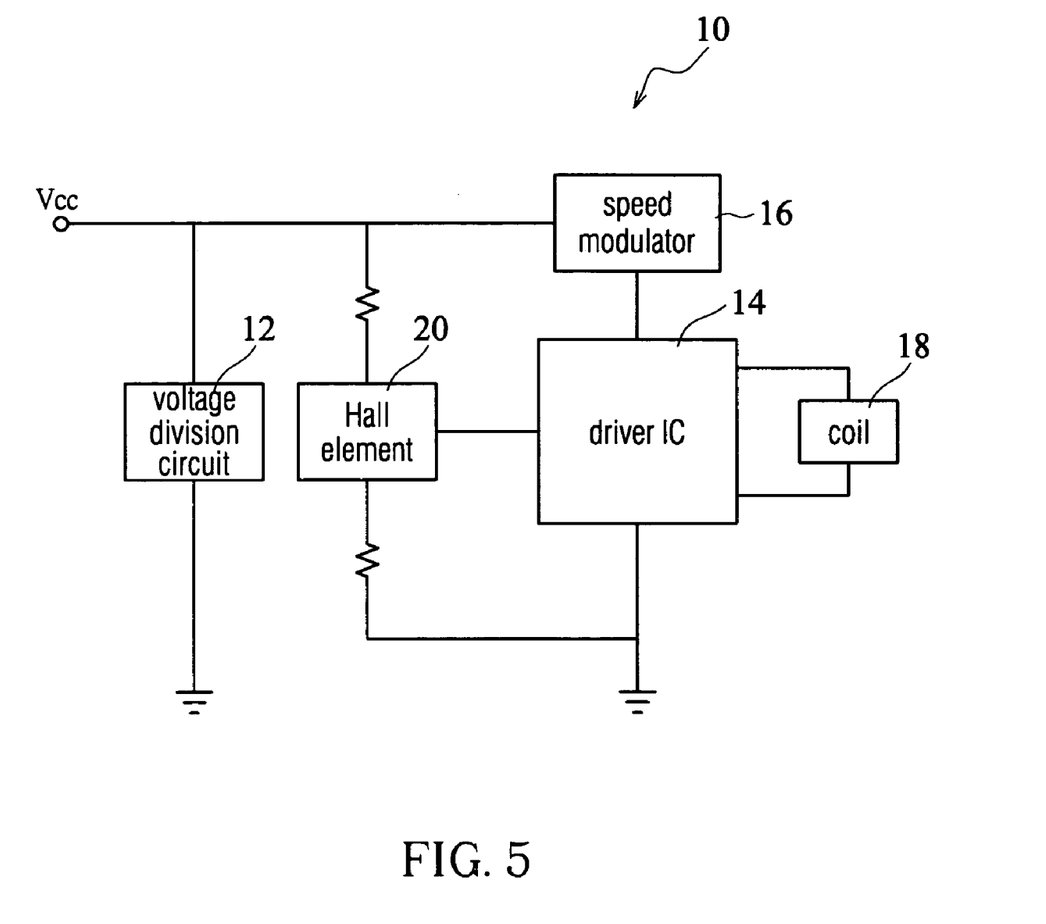
FIG. 5 is a circuit block diagram illustrating a different arrangement of a speed modulator according to the invention.

Though the speed modulator 16 is connected to the ground terminal of the driver IC 14, as shown in FIG. 3, it may be connected to another terminal of the driver IC 14, such as the terminal of the driver IC 14 for connecting the voltage source Vcc, as shown in FIG. 5. Moreover, according to the invention, bifilar winding and unifilar winding are both suitable for the coil 18, and metal-oxide semiconductor field effect transistors (MOSFET) can be used as the transistors Q1 and Q2.

Figure 6:
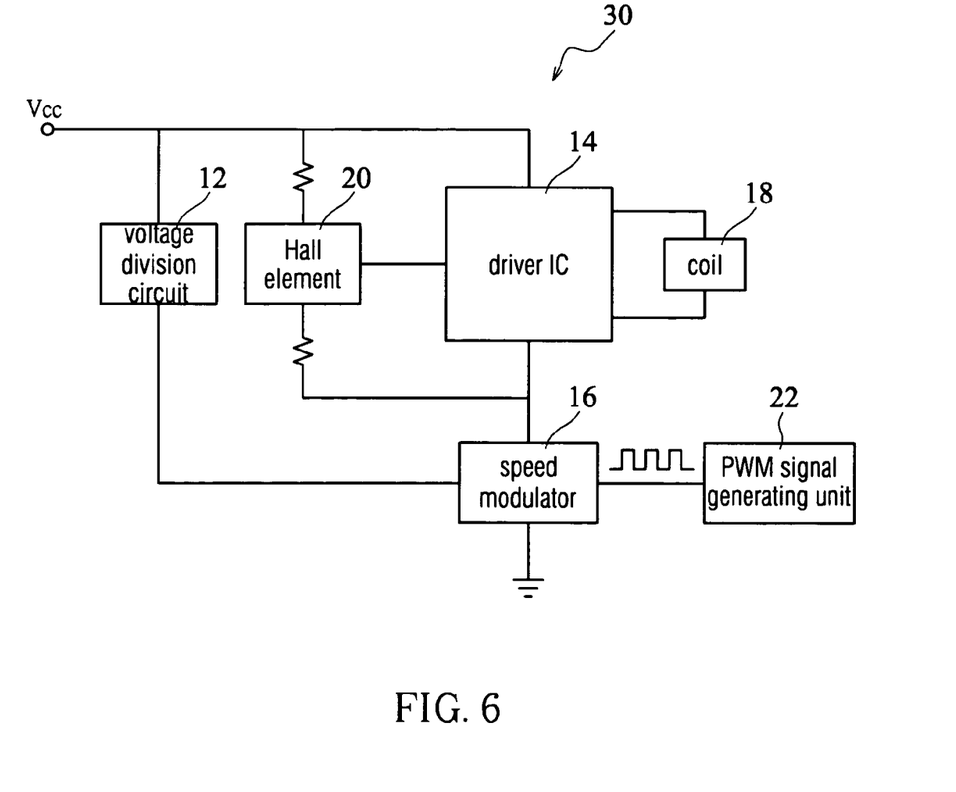
FIG. 6 is a circuit block diagram illustrating another embodiment according to the invention.

Further, the invention can be applied to a fan with a pulse width modulation (PWM) control. As depicted in FIG. 6, a fan motor speed control circuit 30 functions in a way that a PWM signal outputted by a PWM signal generating unit 22 is fed to the driver IC 14 via the speed modulator 16. The speed modulator 16 can also adjust the current value passing through the driver IC 14 to modulate the fan speed as the driver IC 14 outputs a drive signal to the coil 18 according to the PWM signal.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A fan motor speed control circuit, comprising:
    a driving circuit for driving a coil of the fan motor;
    a voltage division circuit comprising a first transistor and a plurality of resistors and connected between a voltage source and the driving circuit; and
    a speed modulator comprising a second transistor and a plurality of parallel resistors and connected between the voltage division circuit and the driving circuit;
    wherein the current of the fan motor speed control circuit flows through a first path under a first input voltage generated from the voltage source and through a second path under a second input voltage larger than the first one; the parallel resistors are in the second path such that the current value passing through the driving circuit varies according to the resulting resistance value of the parallel resistors to enable the fan motor to have various speeds at any selected voltage.

2. The speed control circuit as recited in claim 1, wherein the first transistor is off and the second transistor is on under the first input voltage, whereas the first transistor is on and the second transistor is off under the second input voltage.

3. The speed control circuit as recited in claim 1, wherein the plurality of resistors of the voltage division circuit comprises:
    a first resistor connected between the gate of the first transistor and the voltage source;
    a second resistor connected between the gate of the first transistor and ground;
    a third resistor connected between the drain of the first transistor and the voltage source; and
    a fourth resistor connected between the drain of the first transistor and ground.

4. The speed control circuit as recited in claim 3, wherein the second transistor is connected between the drain of the first transistor and the ground, and the gate of the second transistor is connected to the fourth resistor.

5. The speed control circuit as recited in claim 1, wherein the first and the second transistors are metal-oxide semiconductor field effect transistors (MOSFET).

6. The speed control circuit as recited in claim 1, wherein the driving circuit is incorporated in a driver IC, and the driver IC has a first terminal connected to the voltage source and a second terminal connected to ground.

7. The speed control circuit as recited in claim 6, wherein the speed modulator is connected to the first terminal of the driver IC.

8. The speed control circuit as recited in claim 6, wherein the speed modulator is connected to the second terminal of the driver IC.

9. The speed control circuit as recited in claim 6, wherein the driver IC has a third terminal, and the third terminal is connected to a hall element.

10. The speed control circuit as recited in claim 1, wherein the coil is a unifilar winding.

11. The speed control circuit as recited in claim 1, wherein the coil is a bifilar winding.

12. The speed control circuit as recited in claim 1, further comprising a pulse width modulation (PWM) signal generating unit.

13. The speed control circuit as recited in claim 12, wherein a PWM signal outputted by the PWM signal generating unit is fed to the driver IC via the speed modulator.

14. A fan motor speed control circuit, comprising:
    a driving circuit for driving a coil of the fan motor;
    a voltage division circuit comprising a first transistor and a plurality of resistors and connected between a voltage source and the driving circuit; and
    a speed modulator comprising a second transistor and a variable resistor and connected between the voltage division circuit and the driving circuit;
    wherein the current of the fan motor speed control circuit flows through a first path under a first input voltage generated from the voltage source and through a second path under a second input voltage larger than the first one; the variable resistor is in the second path such that the current value passing through the driving circuit varies according to the resulting resistance value of the variable resistor to enable the fan motor to have various speeds at any selected voltage.

15. The speed control circuit as recited in claim 14, wherein the first transistor is off and the second transistor is on under the first input voltage, whereas the first transistor is on and the second transistor is off under the second input voltage.

16. The speed control circuit as recited in claim 14, wherein the plurality of resistors of the voltage division circuit comprises:
   a first resistor connected between the gate of the first transistor and the voltage source;
   a second resistor connected between the gate of the first transistor and ground;
   a third resistor connected between the drain of the first transistor and the voltage source; and
   a fourth resistor connected between the drain of the first transistor and ground.

17. A speed control circuit as recited in claim 14, wherein the second transistor is connected between the drain of the first transistor and ground, and the gate of the second transistor is connected to the fourth resistor.

18. A fan motor speed control circuit, comprising:
   a driving circuit for driving a coil of the fan motor;
   a voltage division circuit comprising a first switch and connected between a voltage source and the driving circuit; and
   a speed modulator comprising a second switch and a variable resistor and connected between the voltage division circuit and the driving circuit;
   wherein the current of the fan motor speed control circuit flows through a first path under a first input voltage generated from the voltage source and through a second path under a second input voltage larger than the first one; the current value passing through the driving circuit varies according to the resulting resistance value of the variable resistor to enable the fan motor to have various speeds at any selected voltage.

19. A speed control circuit as recited in claim 18, wherein the voltage division circuit further comprises a plurality of resistors.

20. A speed control circuit as recited in claim 18, wherein each of the first switch and the second switch is a transistor.

* * * * *